US011124365B2

(12) United States Patent
Schneuing

(10) Patent No.: US 11,124,365 B2
(45) Date of Patent: Sep. 21, 2021

(54) ACCUMULATING CONVEYOR SYSTEM

(71) Applicant: Vanderlande Industries B.V., Veghel (NL)

(72) Inventor: Ralf Ferdinand Schneuing, Bielefeld (DE)

(73) Assignee: Vanderlande Industries B.V., Veghel (NL)

( * ) Notice: Subject to any disclaimer, the term of this patent is extended or adjusted under 35 U.S.C. 154(b) by 0 days.

(21) Appl. No.: 16/965,795

(22) PCT Filed: Jan. 31, 2019

(86) PCT No.: PCT/EP2019/052353
§ 371 (c)(1),
(2) Date: Jul. 29, 2020

(87) PCT Pub. No.: WO2019/149807
PCT Pub. Date: Aug. 8, 2019

(65) Prior Publication Data
US 2021/0039890 A1     Feb. 11, 2021

(30) Foreign Application Priority Data

Feb. 1, 2018   (DE) ............... 10 2018 201 541.4

(51) Int. Cl.
*B65G 19/02* (2006.01)
*B65G 9/00* (2006.01)
*B65G 19/24* (2006.01)

(52) U.S. Cl.
CPC .......... *B65G 19/025* (2013.01); *B65G 9/002* (2013.01); *B65G 9/008* (2013.01); *B65G 19/245* (2013.01);
(Continued)

(58) Field of Classification Search
CPC ...... B65G 9/002; B65G 9/008; B65G 19/025; B65G 19/245; B65G 2201/0229; B65G 2201/0238
See application file for complete search history.

(56) References Cited

U.S. PATENT DOCUMENTS 5,231,932 A * 8/1993 Enderlein ............ B65G 19/025
                                                        104/162
5,404,992 A    4/1995 Robu et al.
(Continued)

FOREIGN PATENT DOCUMENTS

DE     40 17 821 A1   12/1990
DE     4017821 A1 *   12/1990 ........... B65G 19/025
(Continued)

OTHER PUBLICATIONS

International Search Report and Written Opinion for International Application No. PCT/EP2019/052353, dated Apr. 24, 2019.
(Continued)

*Primary Examiner* — Gene O Crawford
*Assistant Examiner* — Keith R Campbell
(74) *Attorney, Agent, or Firm* — Wolf, Greenfield & Sacks, P.C.

(57) ABSTRACT

A conveyor system comprising a plurality of conveyor elements forming a conveyor chain for conveying hanging goods, wherein the conveyor chain extends along a conveyor path. A plurality of hanging elements are movable along and mounted on a guide which extends at least in sections parallel to the conveyor path. The hanging elements comprise an engaging section configured to contact in each case one of the conveyor elements to receive a driving force from the conveyor element which is directed along the guide. The engaging section of the hanging elements is tiltable between a conveying position and an accumulating position, wherein the engaging section is straightened in the
(Continued)

conveying position to receive the driving force, and is tilted away in the accumulating position to evade the driving force. The engaging section presses into its conveying position.

11 Claims, 3 Drawing Sheets

(52) U.S. Cl.
CPC ............ *B65G 2201/0229* (2013.01); *B65G 2201/0238* (2013.01)

(56) References Cited

U.S. PATENT DOCUMENTS

| | | | | |
|---|---|---|---|---|
| 5,819,906 | A * | 10/1998 | Enderlein | B61B 10/025 198/687.1 |
| 6,554,127 | B1 * | 4/2003 | Kroll | B61B 10/025 104/172.4 |
| 9,205,990 | B2 * | 12/2015 | Otto | B65G 19/025 |
| 9,931,722 | B2 * | 4/2018 | Guhl | B65G 19/025 |
| 10,046,914 | B1 * | 8/2018 | Otto | B65G 17/20 |
| 10,464,752 | B2 * | 11/2019 | Iwata | B65G 17/086 |
| 2003/0150696 | A1 | 8/2003 | Walter et al. | |
| 2011/0214967 | A1 | 9/2011 | Wend et al. | |
| 2015/0239671 | A1 * | 8/2015 | Wend | B65G 17/20 198/347.1 |

FOREIGN PATENT DOCUMENTS

| | | |
|---|---|---|
| DE | 91 06 794 U1 | 11/1992 |
| DE | 93 06 659 U1 | 10/1994 |
| DE | 100 31 033 A1 | 1/2002 |
| DE | 10 2010 010 107 A1 | 9/2011 |
| DE | 20 2017 107 908 U1 | 2/2018 |
| EP | 0 304 543 A1 | 3/1989 |
| EP | 1 690 811 A1 | 8/2006 |

OTHER PUBLICATIONS

Ch.II International Preliminary Report on Patentability for International Application No. PCT/EP2019/052353, dated Aug. 14, 2020.

* cited by examiner

ACCUMULATING CONVEYOR SYSTEM

This Application is a national stage filing under 35 U.S.C. 371 of International Patent Application No. PCT/EP2019/052353, filed Jan. 31, 2019, which claims priority to German application no. 10 2018 201 541.4, filed Feb. 1, 2018, each of which is herein incorporated by reference in its entirety.

TECHNICAL FIELD

The present invention relates to a conveyor system comprising a plurality of conveyor elements forming a conveyor chain for conveying hanging goods, wherein the conveyor chain extends along a conveyor path. The conveyor system further comprises a plurality of hanging elements movable along a guide and mounted on the guide, wherein the guide extends at least in sections parallel to the conveyor path. The hanging elements further comprise an engaging section configured to contact in each case one of the conveyor elements in order to receive a driving force from the conveyor element which is directed along the guide.

Moreover, the present invention relates to a hanging element for such a conveyor system, which comprises one or more rollers via which the hanging element can be mounted on a guide of the conveyor system.

PRIOR ART

Conveyor systems of the above technical field are generally known from the prior art. A "transport device for a hanging conveyor device" is known in particular from laid-open document DE 40 17 821 A1, in which an endless conveyor chain made up of conveyor elements is provided with bristles which interact with hanging elements like a sliding clutch to drive these hanging elements. The hanging elements therein are configured as carrying wagons which are moved over a sliding rail and each comprises an engaging section via which the bristles can engage with the carrying wagon in order to drive the carrying wagon.

Basically, the configuration of the conveyor elements with bristles has the advantage that the bristles are stiff enough to take the carrying wagons along but, if there is a congestion, they slide over the engaging sections of the carrying wagons and thus act like a sliding clutch.

However, when accumulating the hanging elements, which in the prior art are referred to as carrying wagons, a considerable force is exerted on the hanging elements when they are accumulated. This encumbers the stopper used for the accumulation as well as the bristles of the conveyor elements and all other components used in connection with the drive of the hanging elements.

Against this background, one object of the present invention is to provide a conveyor system which allows a more gentle accumulation of the hanging elements and thus increases durability and reliability without having to rely on more resistant materials.

DESCRIPTION OF THE INVENTION

According to the invention, the above object is solved by a conveyor system according to claim 1. This object is further solved by a hanging element according to claim 8. Advantageous configurations of the invention can be found in the respective subclaims.

The conveyor system according to the invention of the above technical field comprises a plurality of conveyor elements forming a conveyor chain for conveying hanging goods, wherein the conveyor chain extends along a conveyor path, a plurality of hanging elements movable along a guide and mounted on the guide, wherein the guide extends at least in sections parallel to the conveyor path, wherein the hanging elements comprise an engaging section configured to contact in each case one of the conveyor elements in order to receive a driving force from the conveyor element which is directed along the guide. According to the invention, this conveyor system is characterized in that the engaging section of the hanging elements is tiltable between a conveying position and an accumulating position, wherein the engaging section is straightened in the conveying position in order to receive the driving force, and is tilted away in the accumulating position in order to evade the driving force. The engaging section thereby presses into its conveying position.

Owing to the fact that the engaging section of the hanging elements is tiltable between the conveying position and the accumulating position, the force exerted by the conveyor elements can be transmitted to the hanging element when the engaging section is in the straightened state, while the engaging section is, however, also able to evade this driving force by tilting away.

The present invention basically adopts the principle of transmission of the driving force in a manner similar to a sliding clutch, as known, for example, from DE 40 17 821 A1. In addition, the hanging element is configured to selectively reduce the frictional resistance between the hanging element and the conveyor element and, thus, to limit the load of the entire system in the accumulated state of the hanging elements.

Owing to the fact that the engaging section presses into its conveying position, it is ensured that the hanging element does not remain it its accumulating position where it does not receive any driving force. This can be caused by various mechanisms. In particular, the hanging element can be configured such that it always straightens up like a roly-poly toy owing to the effect of gravity.

The driving force from the conveyor element acts on the hanging element if and for as long as the hanging element is in the conveying position. Moreover, a frictional force of the guide on which the hanging element is mounted acts on the hanging element. A straightening force, with which the engaging section presses into its conveying position, counteracts the driving force of the conveyor element.

In a preferred embodiment, the hanging element is configured such that the driving force acts on the engaging section and the frictional force acts on a different part of the hanging element, i.e. the part via which the hanging element is mounted on the guide, in such a manner that the sum of the driving force and the frictional force results in a first torque which urges the hanging element to tilt out of the conveying position into the accumulating position. Preferably, an opposite straightening torque is formed by the straightening force and the friction from the hanging element, which enables conveyance of the hanging element in that the engaging section does not tilt out of the conveying position into the accumulating position.

Alternatively, the straightening force can also be generated by a spring element.

Since the engaging section tilts out of the conveying position into the accumulating position as soon as the driving force acting on it exceeds the straightening force, the maximum frictional force to overcome can be determined by the size of the straightening force: If the friction, for example from a stopper or a similar element used for accumulation, exceeds the straightening force, the engaging section tilts away into the accumulating position before a driving force exceeding the friction can be applied to the hanging element.

To drive the hanging element, a driving force greater than the opposite frictional force must be exerted on the hanging element. At the same time, the driving force must not be greater than the straightening force of the engaging section so that the engaging section does not tilt out of the conveying position into the accumulating position and thus gives way.

As soon as the frictional force falls below the straightening force again, the driving force required to overcome this lower frictional force can be exerted on the hanging element which is thus driven. If there is low friction, i.e. when the straightening force exceeds the frictional force, a driving force exceeding the friction can be applied to the hanging element to drive it.

The present invention thus makes it possible to define a maximum driving force to be exerted on the hanging element so as to reduce the load on the components connected to the drive that arises during accumulation of the hanging elements. This increases the reliability and durability of the conveyor systems compared to the prior art.

In a preferred embodiment, the conveyor chain is closed. The present invention and in particular the ability to evade the driving force, and thus to reduce the load on the components connected to the drive, has particular advantages in connection with an endless driving form by a closed conveyor chain. Alternatively, however, the conveyor chain can also be open, i.e. can have a start and an end.

It is preferred that at least one of the conveyor elements has bristles for contacting the engaging section of the hanging elements to apply the driving force. It is further preferred that several conveyor elements, particularly preferred all of the conveyor elements, have bristles for contacting the engaging section of the hanging elements to apply the driving force.

Bristles of this type are generally known from the prior art and are, in particular, also shown in document DE 40 17 821 A1, in order to realize a kind of sliding clutch, i.e. a largely flexible contact between a conveyor element and a hanging element or a carrying wagon or the like. However, in the context of the present invention, bristles are also particularly advantageous since they enable the driving force between the conveyor element and the hanging element to be spontaneously reapplied at any time. If, for example, a stopper or the like is released to accumulate the hanging elements, the straightening force immediately causes the engaging sections to tilt back into their conveying positions and to be immediately gripped by the bristles since these form a, so to speak, continuous coupling of the conveyor elements to the hanging elements. This means that the hanging elements do not each first have to wait for an approaching conveyor element but can directly receive the driving force when straightening.

In this way, the conveyor system according to the invention enables a particularly fast reaction time to the control pulses for a stopper or the like to accumulate and further convey the hanging elements. The accumulation and further conveyance of the hanging elements can therefore be realized particularly precise, thus maximizing the efficiency of the system.

Alternatively, comb conveyors or other types of conveyor elements can also be used to interact with the engaging section of the hanging elements and to apply the driving force to the hanging element.

Preferably, the guide has a rail configured to accommodate one or more rollers. Such a rail makes it particularly easy to guide the hanging elements in the guide in such a way that they are on the one hand movable along the guide, are on the other hand mounted in the guide and can also be tilted relative to the guide or other static elements. Alternatively, however, the guide can also be configured, for example, as a combination of slide guide and bearing, wherein the slide guide is not explicitly configured to accommodate and support, but only to guide, the roller or rollers.

It is advantageous that the hanging elements are configured in particular as bags to receive an item of the hanging goods. Such (preferably bag-shaped) hanging elements have proven to be successful when individual parts are to be conveyed through the conveyor systems. This is especially important if the individual parts do not have the same shape and, in particular, cannot be easily hung up.

Thus, while coat hangers or similar elements also come into consideration as hanging elements for garments which can be transported hanging on a hanger, parcels or other lying goods cannot be easily transported on such a hanger and must therefore be accommodated on a bearing surface or in a bag or a similar element. However, as an alternative to a bag or a similar element for accommodating an item of the hanging goods, the hanging element can also be configured as a hanger which is particularly suitable for the transport of garments or the like.

In a preferred embodiment, the hanging element is configured such that the engaging section presses into the conveying position owing to the gravity or a spring force acting on the hanging element. Gravity can be used in particular in that the hanging element forms a lever mechanism so that the gravity acting on the hanging element, in particular the goods suspended from it, straightens the engaging section in order to get into the conveying position. In addition to gravity, a spring force can preferably also be used. This spring force is also preferred since it does not require any additional energy source, which renders the conveyor system less complex and expensive and virtually leads to maintenance-freedom in connection with the engaging section pressing into the conveying position. However, as an alternative to gravity or spring force, other power sources can also be used, for example actuators that are able to move the engaging section into a conveying position in a targeted and, if necessary, computer-controlled manner. Particularly in the case of actuators, it is also possible to transfer the engaging section out of the accumulating position into the conveying position and vice versa in a manner other than by tilting.

Preferably, the conveyor system comprises a stopper for accumulating the hanging elements along the guide. Such a stopper is of great significance for the implementation of an accumulating conveyor system and enables a targeted control of the sequence of movements of the individual hanging elements and the items conveyed therewith. The stopper can selectively accumulate the hanging elements by interrupting conveyance of the hanging elements, and it can also enable further conveyance. The stopper is therefore a very efficient instrument for the control of the conveyor system and offers considerable advantages precisely in connection with the present invention.

The reason is that the stopper can even better play to its strengths in connection with the present invention than in prior art systems. The reason for this is that the invention is able to considerably reduce the friction forces and other loads otherwise acting on the hanging elements, conveyor elements and other parts connected to the drive, which arise during accumulation, i.e. interruption of the conveyance of the hanging elements. This means that the stopper can be used in a more versatile way without having to fundamentally redesign, for example reinforce, the conveyor system.

Alternatively, however, such a stopper can also be dispensed with if the conveyor system uses other elements to control the conveyance of the individual parts. For this purpose, the prior art basically also offers solutions that are known to the skilled person.

A hanging element according to the invention for a conveyor system as described above comprises one or more rollers via which the hanging element can be mounted on a guide of the conveyor systems. The hanging element further comprises an engaging section configured to contact a conveyor element in order to receive a driving force directed along the guide. According to the invention, the engaging section of the hanging element is tiltable between a conveying position and an accumulating position, wherein the engaging section is straightened in the conveying position in order to receive the driving force, and is tilted away in the accumulating position in order to evade the driving force. The engaging section thereby presses into its conveying position.

A hanging element of this type is particularly well suited to a conveyor system according to the present invention and thus achieves, or at least contributes to, the advantages mentioned in connection with the description of the conveyor system.

In a preferred embodiment, the hanging element is in particular configured as a bag for accommodating hanging goods. This enables a particularly flexible use of the hanging element also for lying goods since the requirements placed on the goods to be conveyed by the hanging element are minimal. Alternatively, however, the hanging element can also be configured as a hanger.

The present invention is particularly suitable for use in a conveyor chain for conveying hanging goods according to DE 10 2014 224 253 A1, the disclosure of which is incorporated by reference herein. Further advantages and preferred features of the invention are evident from the entirety of the claims and the following description of the figures.

WAYS OF IMPLEMENTING THE INVENTION

Figure 1:
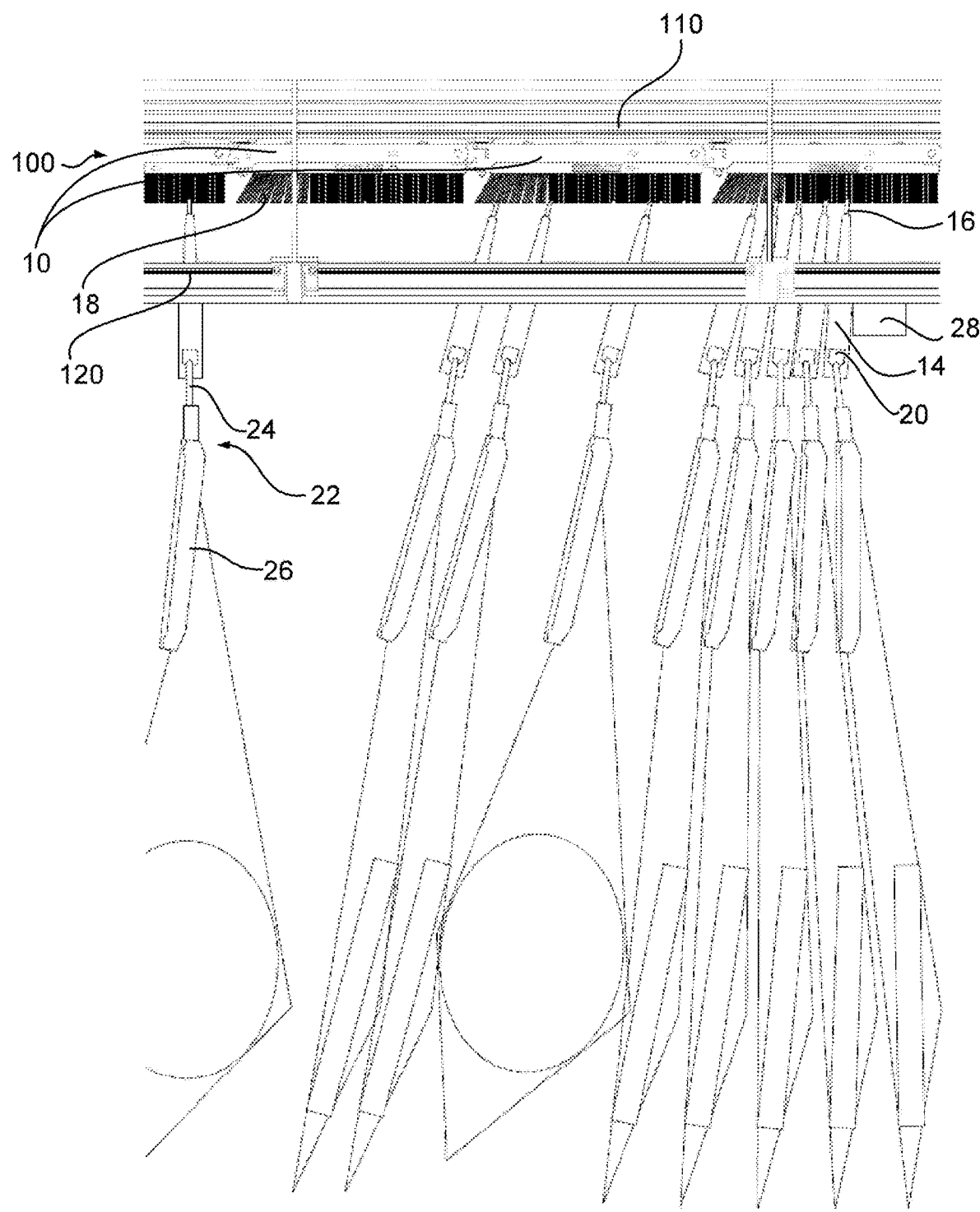
FIG. 1 shows a preferred embodiment of a conveyor system, in which hanging elements are being accumulated.

FIG. 1 shows a preferred embodiment of a conveyor system having a plurality of hanging elements 10 forming a conveyor chain 100 for conveying hanging goods. The conveyor chain 100 can in particular be configured such as the conveyor chain described in DE 10 2014 224 253 A1.

The conveyor chain 100 extends along a conveyor path 110 indicated in FIG. 1, which in the present embodiment is configured as a rail and a guide of the conveyor chain 100, i.e. the individual conveyor elements 10. In the embodiment shown here, the conveyor path 110 extends parallel to a guide 120 along which a plurality of hanging elements 14 are movable and on which these hanging elements 14 are also mounted.

Although, in FIG. 1, the guide 120 extends completely parallel to the conveyor path 110, this does not have to be true for each section of the conveyor path 110 or guide 120. In particular the distance between the conveyor path 110 and thus the conveyor elements 10 on the one hand and the guide 120 and thus the hanging elements 14 on the other hand, can change over the course of the conveyor path 110 and the guide 120. A variation of this distance results in that the engagement, more precisely the extension of the engagement, between the conveyor elements 10 and the hanging elements 14 changes, which inter alia also affects the driving force of the conveyor elements 10 on the hanging elements 14.

FIG. 1 shows one engaging section 16 for each of the hanging elements 14, said engaging section 16 being configured to contact in each case one of the conveyor elements 10 in order to receive a driving force from the conveyor element 10 which is directed along the guide 120. In the present embodiment, this engaging section 16 is formed by the end of the respective hanging element 14, which protrudes furthest in direction of the conveyor elements 10.

In the embodiment shown in FIG. 1, the engaging section 16 engages with bristles 18 of the conveyor elements 10, which are used for the force transmission between the conveyor elements 10 and the hanging elements 14, i.e. for the application of the driving force. Thus, if the distance between the guide 120 and the conveyor path 110 changes, the amount by which the engaging section 16 extends into the bristles 18 also changes. The deeper the engaging sections 16 of the hanging elements 14 penetrate the bristles 18, the greater the driving force that can be applied to the hanging elements 14 by the bristles. Along the conveyor path 110, it can occur that the required driving force varies, for example if the hanging elements have to surmount an alternating upward and downward path. In such a situation, the distance between the conveyor path 110 and the guide 120 could be reduced such that the engagement of the engaging section 16 with the bristles 18 is sufficiently increased or reduced, respectively.

In the embodiment shown in FIG. 1, a stopper 28 accumulating the hanging elements 14 is also disposed on the guide 120. In this situation, the hanging elements 14 are conveyed on the guide 120 by the conveyor elements 10 until they come into contact with the stopper 28 or a preceding hanging element 14 and are thus stopped. Thus, the hanging elements 14 are accumulated at the stopper 28.

Since the force transmission between the conveyor elements 10 and the hanging elements 14 via the bristles 18 allows slippage and since, according to the invention, the hanging elements 14 are also suited to evade the driving force by the conveyor elements 10 by tilting away, an accumulation of the hanging elements 14 at the stopper 28 and a conveying of the hanging elements 14 located further upstream can occur simultaneously such that the hanging elements can thus be compacted, i.e. their distance on the guide 120 can be reduced.

The hanging elements 14 comprise, at their side opposite the engaging section 16 with respect to the guide 120, an eyelet 20 with which a hook 24 of a bag 22 or of a coat hanger can engage. In addition to the hook 24, the bag 22 further comprises, among other things, a bag body 26 into which the goods to be conveyed can be placed. The gravity exerted on the bag 22 and possibly also on its contents acts via the eyelet 20 on the hanging elements 14 in such a way that the engaging section 16 always wants to straighten up, i.e. presses into its conveying position.

In the accumulated state, i.e. when stopper 28 is closed, the friction of the hanging elements 14 jumps considerably such that the driving force required to overcome this friction is greater than the straightening force. In the accumulated state, in which the straightening force is lower than the required driving force, the driving force of the conveyor elements 10 on the hanging elements 14 causes the hanging elements 14 to tilt away in the conveying direction in order to evade, as far as possible, the driving force.

Figure 2:
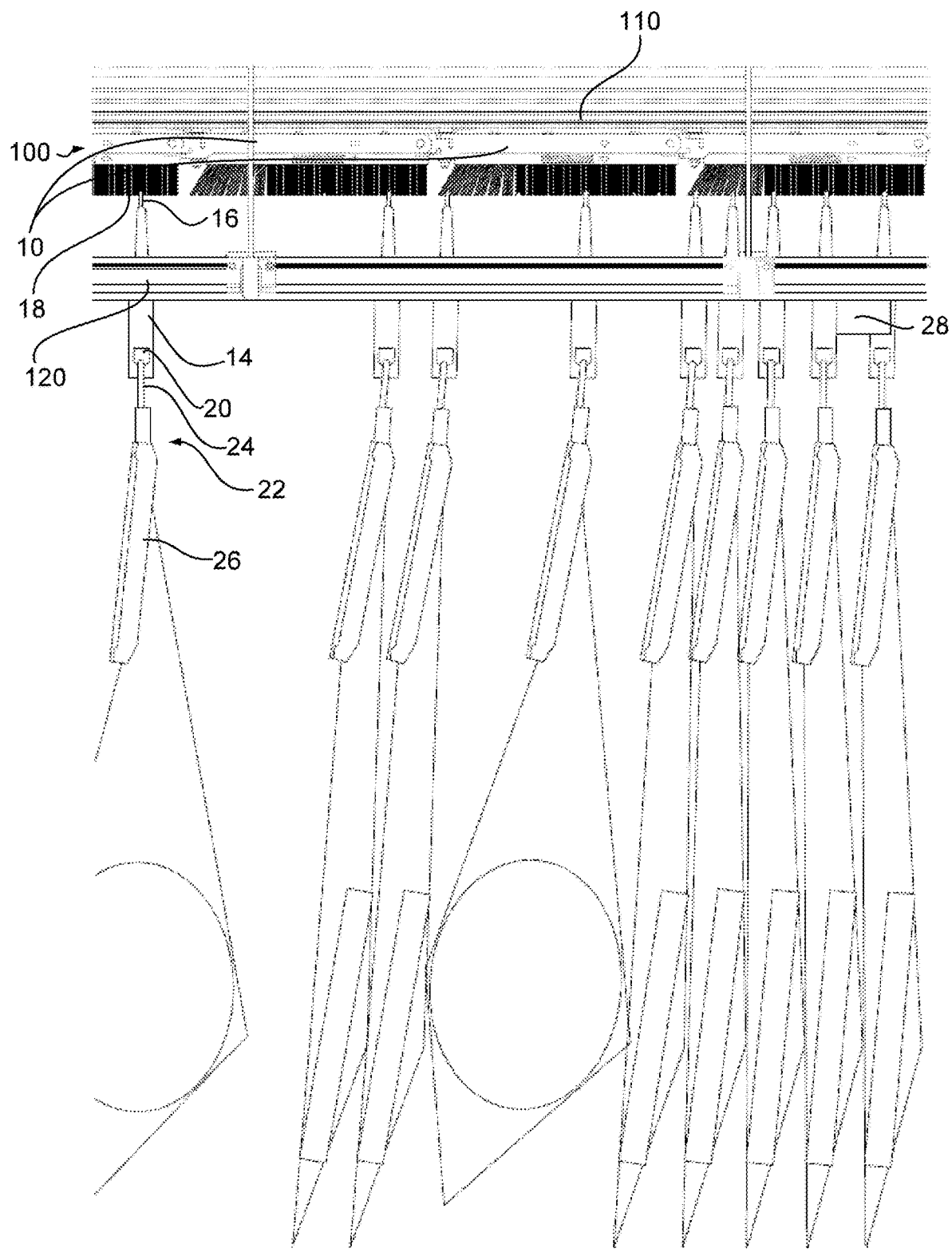
FIG. 2 shows a preferred embodiment of a conveyor system, in which hanging elements are not accumulated but conveyed in parallel to each other.

FIG. 2 shows the same embodiment as FIG. 1, however in a state in which the stopper 28 is open after the hanging elements 14 have been accumulated. In comparison to FIG. 1, it is noticeable that the individual hanging elements 14 already accumulated in the right part of the picture are arranged much closer to each other than the hanging elements still to be accumulated in the left part of FIG. 1.

Moreover, the elements shown in FIG. 1 correspond precisely to those of FIG. 2, and therefore a repeated description of these elements will be dispensed with.

The embodiment shown in FIGS. 1 and 2 illustrates a conveyor system which allows an efficient accumulation of hanging elements without placing a heavy load on the components connected to the drive of the hanging elements. At the same time, the conveyor system can be operated particularly efficiently since the hanging elements can be conveyed further immediately after release of the stopper 28 causing the accumulation. The preferred conveyor system can thus achieve a particularly high conveying density, which noticeably increases the efficiency of the overall conveyor system.

Figure 3:
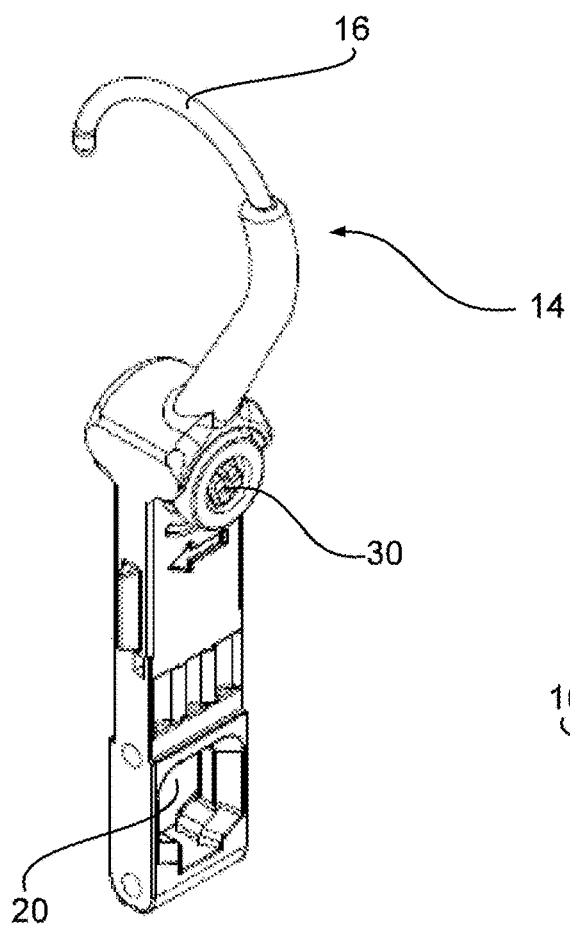
FIGS. 3 and 4 show a preferred embodiment of a hanging element for a preferred conveyor system.
Figure 4:
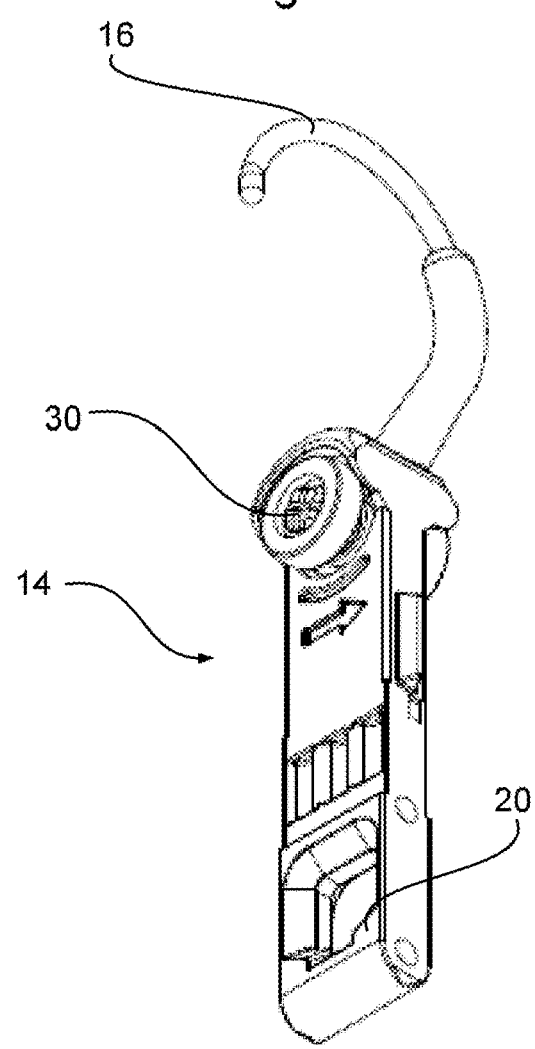

FIGS. 3 and 4 show a preferred embodiment of a hanging element 14. This hanging element comprises a hook, the outer section of which is configured as an engaging section 16 within the meaning of the conveyor system described above. The engaging section enables the bristles 18 of the conveyor elements 10 to engage with the engaging section and thus to receive a driving force.

The hanging element 14 comprises a roller 30 which is in the present embodiment configured as a double roller and by means of which the hanging element 14 is mounted on the guide 120. The roller 30 rolls in the guide 120 such that even heavy objects to be conveyed can be conveyed by the hanging element 14 with relatively low force.

The roller 30 has an axis about which the hanging element 14 can be tilted between the conveying position and the accumulating position. The hook with the engaging section 16 on the one hand and a body with the eyelet 20 on the other hand move as a rocker about the roller 30 from levers facing each other and extending in opposite directions so as to tilt back and forth between the conveying position and the accumulating position.

The invention claimed is:

1. A conveyor system comprising:
   a plurality of conveyor elements forming a conveyor chain configured to convey hanging goods, wherein the conveyor chain extends along a conveyor path,
   a plurality of hanging elements movable along a guide and mounted on the guide, wherein the guide extends at least in sections parallel to the conveyor path,
   wherein the hanging elements comprise an engaging section configured to contact in each case one of the conveyor elements to receive a driving force from the conveyor element which is directed along the guide,
   wherein the engaging section of the hanging elements is tiltable between a conveying position and an accumulating position,
   wherein the engaging section is straightened in the conveying position to receive the driving force and is tilted away in the accumulating position to evade the driving force,
   wherein the engaging section presses into the conveying position, and
   wherein at least one of the conveyor elements comprises bristles configured to contact the engaging section of the hanging elements to apply the driving force.

2. The conveyor system according to claim 1, wherein the conveyor chain is closed.

3. The conveyor system according to claim 1, wherein the guide comprises a rail configured to accommodate one or more rollers of a hanging element mounted on the guide.

4. The conveyor system according to claim 1, wherein the hanging elements are configured to receive one piece of the hanging goods.

5. The conveyor system according to claim 1, wherein each of the hanging elements is configured such that the engaging section presses into the conveying position by gravity acting on the hanging element or by an elastic force.

6. The conveyor system according to claim 1, comprising a stopper configured to accumulate the hanging elements along the guide.

7. The conveyor system according to claim 1, wherein each of the plurality of hanging elements comprises one or more rollers via which each hanging element is mounted on the guide of the conveyor system.

8. The conveyor system according to claim 7, which wherein each of the plurality of hanging elements is configured to receive hanging goods.

9. The conveyor system according to claim 8, wherein the hanging goods include a bag.

10. The conveyor system according to claim 1, wherein a plurality of the conveyor elements comprise bristles configured to contact the engaging section of the hanging elements to apply the driving force.

11. The conveyor system according to claim 1, wherein all of the conveyor elements comprise bristles configured to contact the engaging section of the hanging elements to apply the driving force.

* * * * *

UNITED STATES PATENT AND TRADEMARK OFFICE
CERTIFICATE OF CORRECTION

| | | |
|---|---|---|
| PATENT NO. | : 11,124,365 B2 | Page 1 of 1 |
| APPLICATION NO. | : 16/965795 | |
| DATED | : September 21, 2021 | |
| INVENTOR(S) | : Ralf Ferdinand Schneuing | |

It is certified that error appears in the above-identified patent and that said Letters Patent is hereby corrected as shown below:

In the Claims

At Column 8, Line 42, Claim 8, please delete "which"

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*